Figure 1:
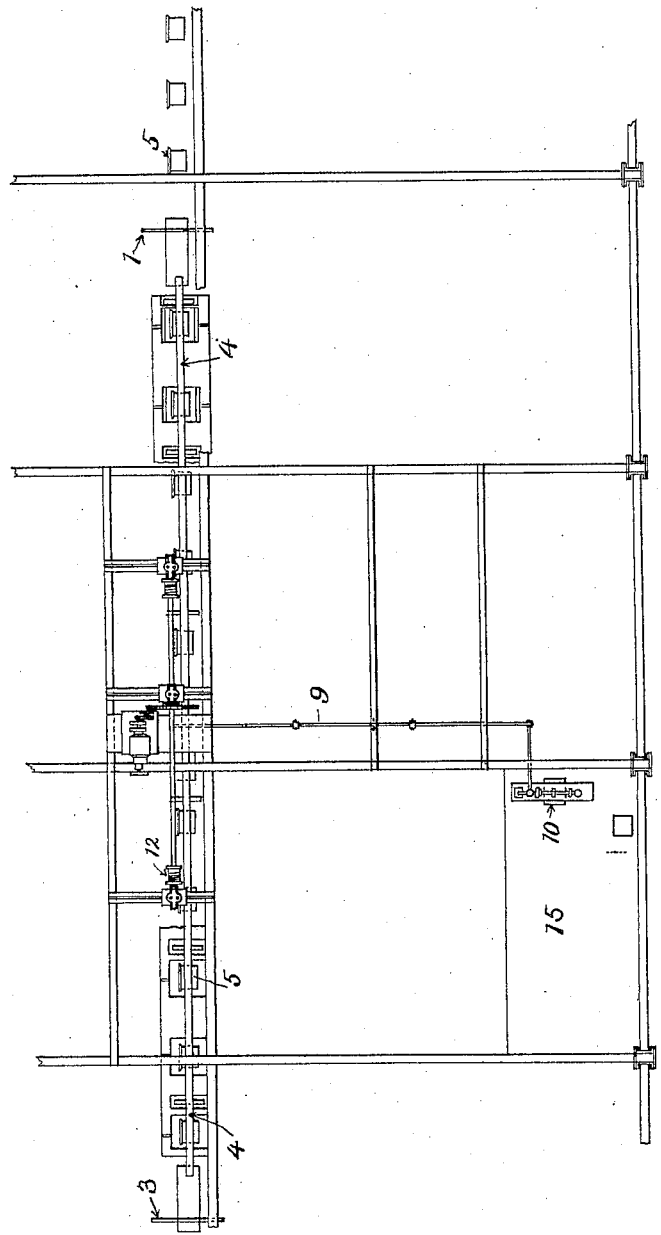

(No Model.) 2 Sheets—Sheet 1.
M. M. SUPPES.
WEIGHING DEVICE FOR ROLLING MILLS.

No. 576,627. Patented Feb. 9, 1897.

WITNESSES:

INVENTOR
BY
ATTORNEY.

(No Model.) 2 Sheets—Sheet 2.
M. M. SUPPES.
WEIGHING DEVICE FOR ROLLING MILLS.
No. 576,627. Patented Feb. 9, 1897.
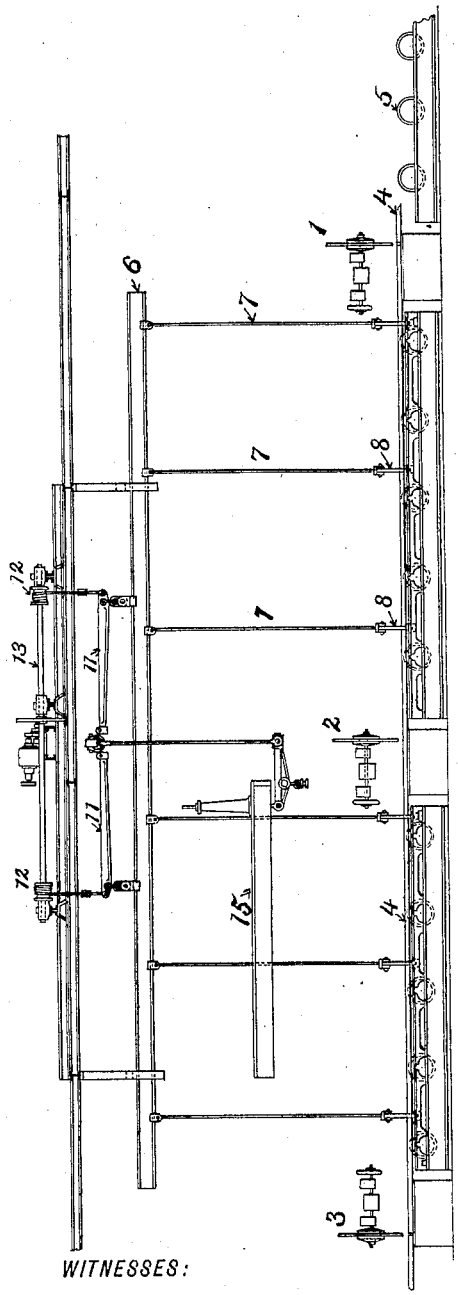
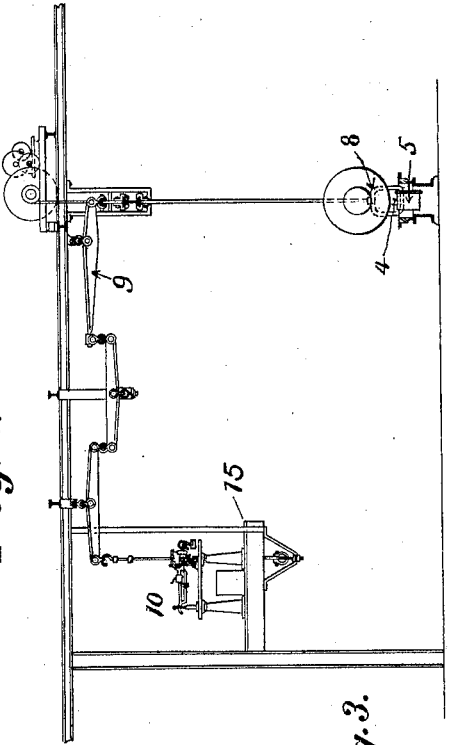
WITNESSES:
INVENTOR
BY
ATTORNEY.
THE NORRIS PETERS CO., PHOTO-LITHO., WASHINGTON, D. C.

United States Patent Office.

MAXIMILIAN M. SUPPES, OF LORAIN, OHIO.

WEIGHING DEVICE FOR ROLLING-MILLS.

SPECIFICATION forming part of Letters Patent No. 576,627, dated February 9, 1897.

Application filed June 13, 1896. Serial No. 595,431. (No model.)

*To all whom it may concern:*

Be it known that I, MAXIMILIAN M. SUPPES, of Lorain, county of Lorain, State of Ohio, have invented certain new and useful Improvements in Weighing Devices for Rolling-Mills, of which the following specification is a true and exact description, due reference being had to the accompanying drawings.

My invention relates to certain improvements in rolling-mills, and has for its object to provide an improved means for quickly and readily weighing the rails, bars, blooms, or whatever is being rolled while yet in an unfinished state, so that the roller may at any time know exactly the weight of the section that he is rolling and correct any variation that may occur.

In general terms a rolling-mill embodying my invention contains at an intermediate stage between the rolls and the finishing-department, preferably at what are called the "hot-saws" or "shears" for shearing the rails or bars immediately after rolling, a suitable scales or weighing device for weighing the rails immediately after being cut to the proper length. These scales have been used heretofore, but they have been placed beneath the surface of the table or rollers upon which the rail lies and in this position have been exposed to all the scale and dirt that accumulate upon the table. This scale or oxid from the rail has such a deleterious effect upon the necessarily fine mechanism and adjustment of the scale-levers that they rapidly wear out and lose their accuracy and sensitiveness. The use of these scales, therefore, has not gone into practical use, the common practice being to wait until the rails have come from the hot-beds, a set of common platform-scales being placed at the ends of the bed, so that the rails may be placed upon them on the way to the finishing-department. As the rails lie upon the hot-beds long enough to become cool, sometimes several hours, this time must elapse between the time of rolling and weighing. By this time the mill may have gone onto another section, and the weight is of no value to the roller in adjusting the rolls. By the use of the scales at the saws it is possible to determine the exact weight of the section immediately after it has left the rolls, and thereby the roller is enabled to roll much closer to the desired weight than would be possible were it necessary to wait for several hours before determining the exact weight.

As before stated, the only manner heretofore proposed has been to place the weighing mechanism beneath the table or rollers upon which the rail lies, thus exposing it to the dirt and scale passing through the floor.

By my invention I am enabled to provide an improved construction whereby this exposure and consequent deterioration are avoided and the sensitiveness of the scales remains unimpaired.

Referring to the drawings, Figure 1 shows a top view of that portion of a rolling-mill— viz., at the hot-saws—containing a weighing device embodying my invention. Fig. 2 is a side view of the same. Fig. 3 is a view of the rail longitudinally as it lies on the rollers.

1, 2, and 3 are the hot-saws arranged at proper distances to cut the rail 4 as it lies upon the table-rollers 5. Suspended above the rollers is the beam 6, carrying, by means of the rods 7, the yokes or frames 8, through which the rail passes as it comes from the rolls. Above this beam 6 is the suitable weighing mechanism 9, so arranged as to properly actuate the scale-beam 10. The beam 6 is directly carried by the intermediate levers 11, which are in turn supported by the rope or chain 12 upon shaft 13, which shaft is revolved as desired by suitable mechanism, here shown as an electric motor, but which may be steam-engine, hydraulic, or other suitable power. Normally this beam 6 stands at such height that the yokes 8 are sufficiently low to allow the rail as it passes along the rollers 5 to pass through, but by revolving the shaft 13 the levers 11 are raised, lifting the beam 6 and bringing the yokes 8 up so that they lift the rail free from the table-rollers. The whole weight of the rail is then carried by the beam 6, and through it the weight of the rail may be accurately determined at the scale-beam 10. As soon as this is done, by reversing the shaft 12 the yokes 8 are lowered and the rail again lies upon the rollers and is free to be moved to the hot-bed.

The scale-beam 10 is preferably located upon the platform 15, from which platform the levers operating the saws, table-rollers, and other machinery of this department are operated, so that the whole is immediately under the control of the same man.

It will be understood that after the rails have passed from the hot-saws they are usually transferred to the hot-beds, where they are allowed to cool before being further operated upon.

As before stated, the advantages to be derived from this form of construction are very great. I have found in practice that it greatly facilitates the rolling and may be quickly operated.

I have herein shown and described my invention as applied to the rolling of rails, and where saws are used for the cutting, but it will be understood that it may be applied to the weighing of blooms after they are sheared or to many other similar uses.

Having thus described my invention, what I claim, and desire to protect by Letters Patent, is—

1. In a rolling-mill, in combination, a beam supported above the path of the rail or bar while on its way from the rolls to the hot-bed, members depending from said beam and adapted to engage the rail or bar, means for causing said depending members to lift and support the rail, and suitable weighing mechanism connected with said beam whereby the weight of the rail may be determined.

2. A weighing device for rolling-mills, comprising a beam extending above the path of the rail or bar, members depending from said beam and adapted to engage the rail, suitable scale-levers supporting said beam, vertically-movable fulcra for said levers and mechanism adapted to raise said fulcra.

In testimony whereof I have affixed my signature in presence of two witnesses.

MAXIMILIAN M. SUPPES.

Witnesses:
C. R. HINCHMAN,
GEORGE M. FERGUSON.